US006931443B1

(12) United States Patent
Kawakami et al.

(10) Patent No.: US 6,931,443 B1
(45) Date of Patent: Aug. 16, 2005

(54) DATA COMMUNICATION SYSTEM

(75) Inventors: Eiichiro Kawakami, Tokyo (JP);
Atsuhiko Sugitani, Tokyo (JP); Satoru Shimizu, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 674 days.

(21) Appl. No.: 09/603,622

(22) Filed: Jun. 26, 2000

(30) Foreign Application Priority Data

Jun. 28, 1999 (JP) .................................. 11/181098

(51) Int. Cl.[7] ........................ G06F 15/173; G06F 15/16
(52) U.S. Cl. ...................... 709/224; 709/223; 709/231; 709/232
(58) Field of Search ........ 709/230–237; 714/746–751; 375/354; 379/93

(56) References Cited

U.S. PATENT DOCUMENTS

| 5,473,608 | A | * | 12/1995 | Gagne et al. ................. 370/401 |
| 5,473,676 | A | * | 12/1995 | Frick et al. .............. 379/93.09 |
| 5,572,678 | A | * | 11/1996 | Homma et al. ............. 709/227 |
| 5,604,771 | A | * | 2/1997 | Quiros ........................ 375/326 |
| 5,727,002 | A | * | 3/1998 | Miller et al. ................. 714/748 |
| 5,935,267 | A | * | 8/1999 | Hayakawa ................... 714/748 |
| 6,081,568 | A | * | 6/2000 | Oda ............................ 375/358 |
| 6,141,784 | A | * | 10/2000 | Davis et al. ................. 714/748 |
| 6,404,739 | B1 | * | 6/2002 | Gonno ........................ 370/236 |

OTHER PUBLICATIONS

Miller et al.; StarBurst Multicast File Transfer Protocol (MFTP) Specification; Apr., 1998.*
Buskens et al.; Reliable Multicasting of Continuous Data Streams; Spring 1997; Bell Labs Technical Journal.*
"A Micropower SAW-Stabilized Superregenerative Data Receiver", RFM 1995 Data Book, pp. 1-11.
Saito et al., "Information Communications Protocol", Ohm Co., p. 73.

* cited by examiner

Primary Examiner—Rupal Dharia
Assistant Examiner—Quang N. Nguyen
(74) Attorney, Agent, or Firm—Venable; James R. Burdett

(57) ABSTRACT

The present invention is provided with one main station and a plurality of substations. After transmitting data addressed to all substations, the main station transmits a message addressed to all substations to query whether reception was normal. When unable to receive data normally, the substations transmit a response message to the query message, but do not transmit a response message when data reception was normal. The time for confirming that transmission was normal or abnormal can be shortened by the main station transmitting data addressed to all substations only one time, and by the substations transmitting response messages only in the case of abnormal reception.

11 Claims, 3 Drawing Sheets

DATA COMMUNICATION SYSTEM

BACKGROUND OF THE INVENTION

1. Field of the Invention

The present invention relates to a data communication system that is provided with one main station and one or a plurality of substations, and more particularly to a data communication system for broadcast communications from the main station to the substations.

2. Description of Related Art

Before now, data communication systems having one main station and one or a plurality of substations were known. These data communication systems are systems for broadcast communication from a main station to the substations. Broadcast communication is communication wherein data addressed to one or a plurality of substations are transmitted from one main station. With broadcast communication, the same data can be transmitted to one or a plurality of substations substantially at the same time. In the case of effecting broadcast communication, the main station queries the substations as to whether the data were received normally once a prescribed quantity of data is transmitted. This query operation is generally called polling. Polling methods are disclosed in "Information communications protocol", Tadao Saito and Mitsuhiro Ishizaka, pp. 73, Ohm Co., for example.

In polling by a conventional data communication system, the main station queries each substation individually as to whether the data were received normally. For this reason, the main station must perform the query operation for the same times as the number of substation that received the data. Consequently, when a large number of substations received data, the query operation is performed many times and the data communication becomes inefficient.

SUMMARY OF THE INVENTION

It is an object of the present invention to improve data communication efficiency by simplifying polling in broadcast communication.

In order to achieve this object, the data communication system relating to the present invention comprises the following: means for transmitting data addressed to all substations provided in the main station; means for receiving data provided in the substations; means for transmitting a message addressed to all substations after data are transmitted, to inquire whether reception was normal, provided in the main station; and means for transmitting a response message to the query message, only when said data could not be received normally, provided in the substations.

The time for confirming whether transmission was normal can be shortened by the main station transmitting data addressed to all substations, and the substations transmitting a response message only in the event of abnormal reception.

BRIEF DESCRIPTION OF THE DRAWINGS

Other objects and advantages of the present invention are explained with reference to the following appended drawings.

DESCRIPTION OF THE PREFERRED EMBODIMENTS

Figure 1:
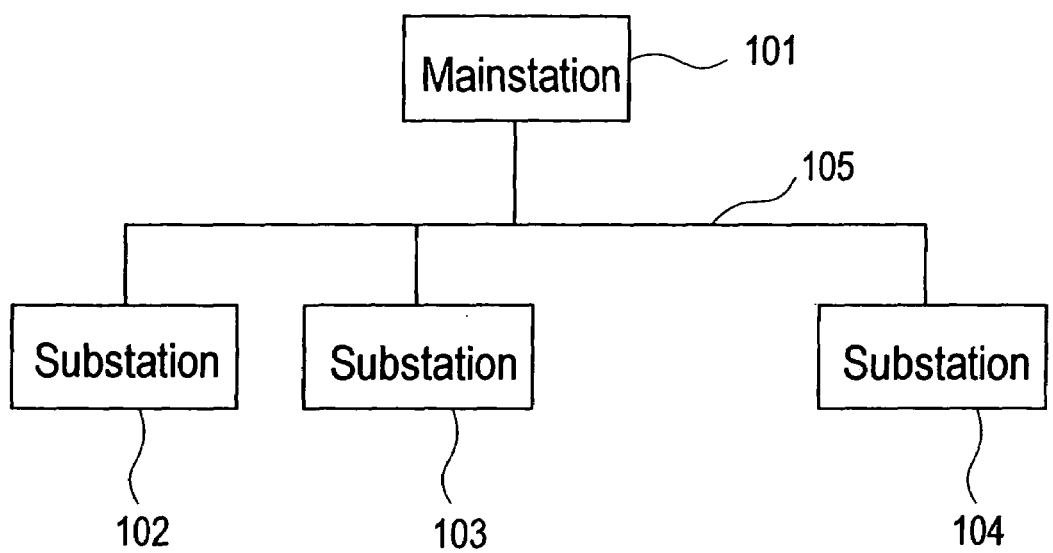
FIG. 1 is a block diagram showing an example constitution of a communication system relating to the present invention.

The embodiments of the present invention are explained below using the drawings. In the drawings, the sizes, forms, and positional relationships among the structural elements are merely to aid in the understanding of the present invention. Moreover, the numerical conditions in the following explanation are merely a simple illustration.

FIG. 1 is a block diagram showing the constitution of a communications system relating to the present embodiment.

As shown in FIG. 1, this communication system comprises one main station 101 and a plurality of substations 102, 103, 104 that are connected by a common transmission line 105.

The main station 101 transmits a prescribed quantity of data on the transmission line 105. The main station 101 then transmits a message, for inquiring whether the transmitted data were received normally, on the transmission line 105. Then, in the case where a response message is received from the transmission line 105 within a prescribed period of time from the transmission of this query message, the previously transmitted data are transmitted another time. On the other hand, when a response message is not received within the prescribed time period, the next data are transmitted.

The substations 102–104 receive data from the transmission line 105 and then, after receiving the data, receive the query message from the transmission line 105. After receiving data, the substations 102–104 determine whether data were received normally or abnormally. In the case of abnormally received data, the substations 102–104 transmit a response message on the transmission line 105 when the query message is received from the transmission line 105. In the case of normally received data, however, response messages are not sent.

Next, the basic communication procedures of the data communication system shown in FIG. 1 are explained.

Figure 2:
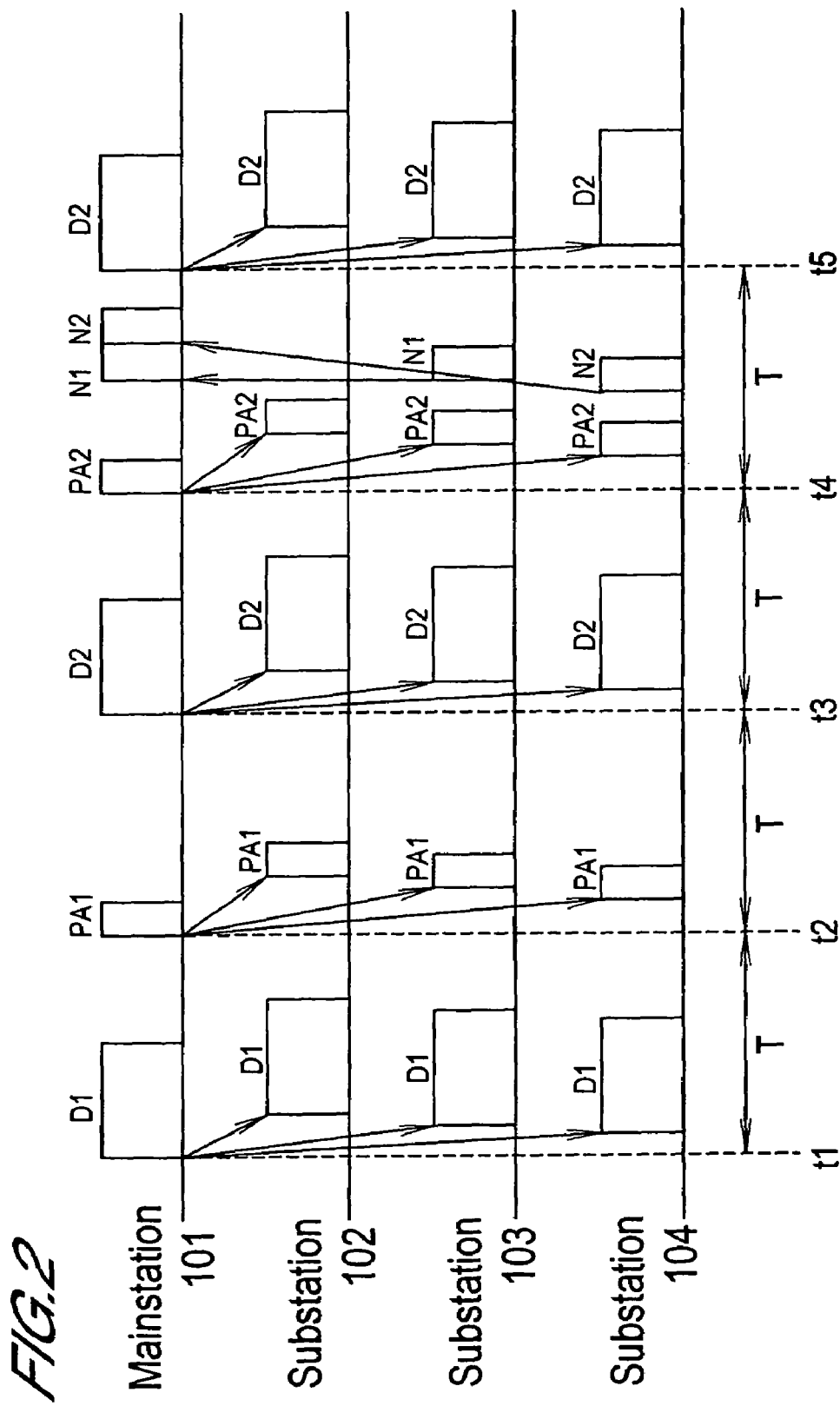
FIGS. 2 and 3 show timing charts for explaining the data communication procedure relating to the present invention.

FIG. 2 is a timing chart for explaining the communication procedures.

The main station 101 effects message transmission and reception synchronized with the period T slot clock. Consequently, times t1–t5 discussed below are given by the leading edge or trailing edge of the slot clock.

At the time t1, the main station 101 transmits the first transmission data D1. This transmission data D1 reaches each substation 102–104 via the transmission line 105. The substations 102–104 thereby receive the same data D1 at essentially the same time.

At time t2, the main station 101 transmits the query message PA1 regarding the transmission data D1. This query message PA1 is addressed to all substations 102–104. The query message PA1 reaches each of the substations 102–104 via the transmission line 105.

The main station 101 effects carrier sensing during the time from the transmission of the query message PA1 until the next transmission time t3. As discussed above, the substations 102–104 return a response message or carrier in the case where data reception was abnormal, but do not return a response message when data reception was normal. In the example in FIG. 2, the main station 101 determines that the transmission data were received normally by all substations 102–104 because the response message was not received by time t3.

Consequently, the main station 101 transmits the next transmission data D2 on transmission line 105 at time t3. The transmission data D2 reach all substations 102–104 via the transmission line 105.

At time t4, main station 101 transmits the query message PA2 for the transmission data D2 on the transmission line 105. The query message PA2 reaches each of the substations 102–104 via the transmission line 105. The main station 101 effects carrier sensing during the time from the transmission of the query message PA2 until the next transmission time t5.

In the example in FIG. 2, the main station 101 detects response messages N1, N2, or carriers, generated from substations 103, 104. With the detection thereof, the main station 101 confirms that reception errors occurred in at least one substation.

Consequently, the main station 101 sends the transmission data D2 once again at time t5. The transmission data D2 are received by substations 102–104 via the transmission line 105. The substation 102 received the data D2 normally at the previous transmission. Consequently, the substation 102 scraps this transmission data D2. Meanwhile, the substations 103 and 104 take up the transmission data D2 because they were unable to receive the data D2 normally at the previous transmission.

In this data communication system, as explained above, the main station 101 is constituted so as to transmit query messages addressed to all substations 102–104, and the substations 102–104 are constituted so as to send response messages only when reception errors occur. Consequently, the time required to confirm reception becomes short even when there is a large number of substations. Consequently, the efficiency of data communication can be improved.

The procedures for when the data communication system shown in FIG. 1 is interrupted during communication are explained next.

Figure 3:
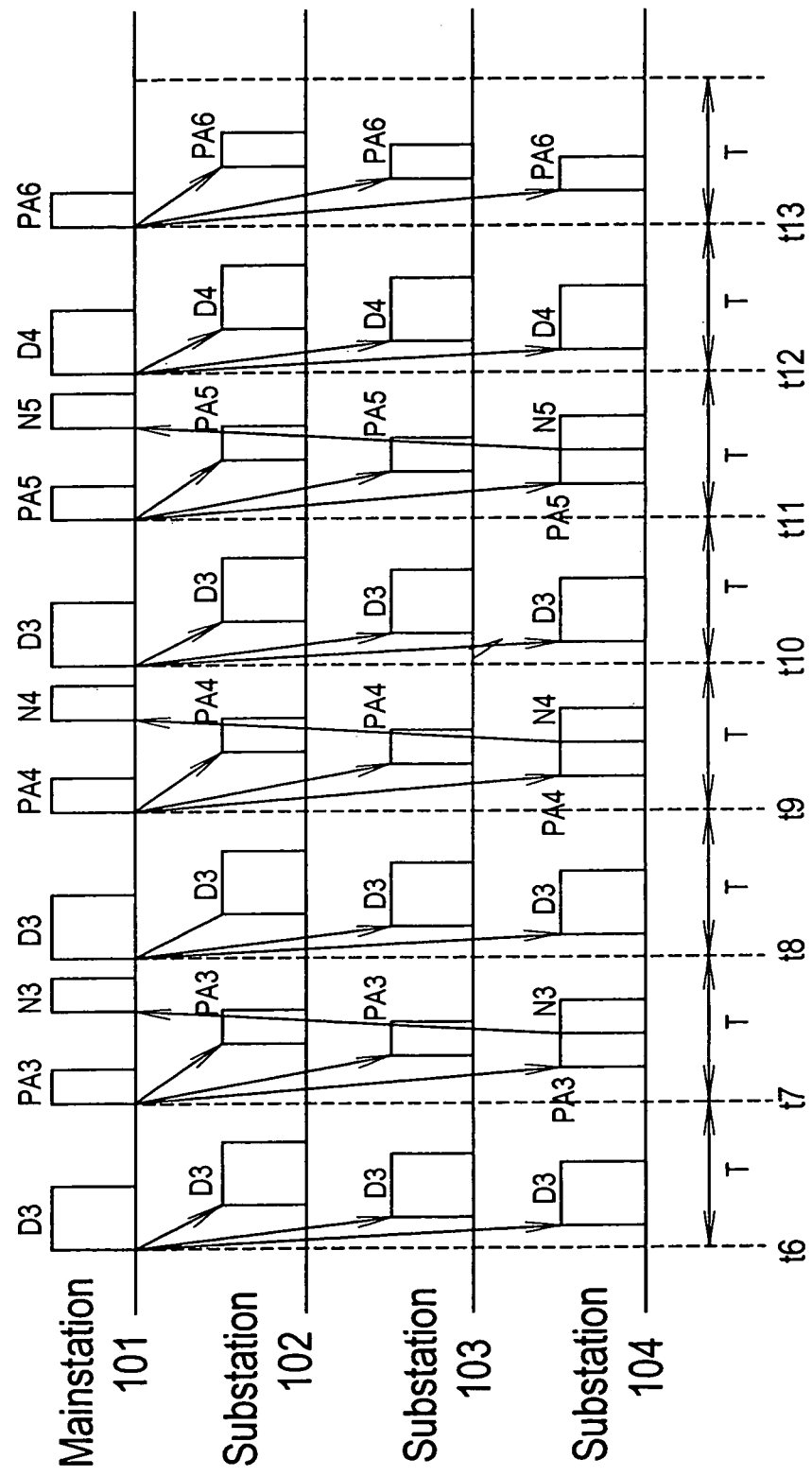

FIG. 3 is a timing chart for explaining the communication procedures. FIG. 3 shows an example of the case where the same data are resent twice by the main station 101.

The main station 101 sends the transmission data D3 at time t6. The transmission data D3 reach the substations 102–104 via the transmission line 105. The substations 102–104 thereby receive the same data D3 at essentially the same time.

The main station 101 transmits the query message PA3 for the transmission data D3 at time t7. This query message PA3 is addressed to all substations 102–104. The query message PA3 reaches each substation 102–104 via the transmission line 105.

The main station 101 effects carrier sensing during the time from the transmission of the query message PA3 until the next transmission time t8. At this time, in the example in FIG. 3, the main station 101 detects a response message N3 generated by substation 103. With the detection thereof, the main station 101 determines that a reception error occurred in at least one substation.

Consequently, the main station 101 sends the transmission data D3 once more at time t8. This transmission data D3 is received by the substations 102 104 via the transmission line 105. Because the substations 102 and 103 received the data D3 normally at the previous transmission, they scrap this transmission data D3. Meanwhile, the substation 104 takes up the received data D3 because the substation 104 was unable to receive the data D3 normally at the previous transmission.

At time t9, the main station 101 transmits the query message PA4 regarding the transmission data D3. This query message PA4 is addressed to all substations 102–104. The query message PA4 reaches each substation 102–104 via the transmission line 105.

The main station 101 effects carrier sensing until the next transmission time t10. At this time, in the example in FIG. 3, the main station 101 detects a response message N4 generated by the substation 103.

The main station 101 sends the transmission data D3 a third time at time t10. The transmission data D3 is received by the substations 102–104 via the transmission line 105. Because the substations 102 and 103 received the data D3 normally at the previous transmission, they scrap this transmission data D3. Meanwhile, the substation 104 takes up the received data D3 because the substation 104 was unable to receive the data D3 normally at the previous transmission.

At time t11, the main station 101 transmits the query message PA5 regarding the transmission data D3. This query message PA5 is addressed to all substations 102–104. The query message PA5 reaches each substation 102–104 via the transmission line 105.

The main station 101 effects carrier sensing until the next transmission time t12. At this time, in the example in FIG. 3, the main station 101 detects a response message N5 generated by the substation 103. However, because the same data D3 have now been resent twice, the main station 101 terminates transmission of the data D3 and transmits the next data D4 at time t12. The main station 101 then transmits a query message PA6 regarding the transmission data D4 at time t13.

As explained above, in this data communication system, re-transmission is terminated when the same data have been resent twice, even if one or more substations which has been unable to receive the data normally are exist. Consequently, it does not become impossible to update all the substations, even if some substations can not received the data normally.

In the embodiment discussed above, an example with a plurality of substations was used, but this can be applied to a data communication system with only one substation.

In the embodiment discussed above, data are resent a maximum of two times, but this maximum may be one time, or three or more times. Furthermore, this maximum can be freely changed by the data communication system administrator depending on conditions.

What is claimed is:

1. A data communication system comprising:
a main station;
plural substations, each of which is connected to said main station by a common transmission line;
a data transmitter which transmits data address to all of said plural substations, provided in said main station;
plural data receivers which receive said data, provided in said plural substations respectively;
a message transmitter which transmits a query message addressed to all of said plural substations after said data are transmitted, to inquire whether reception was normal, provided in said main station; and
plural response transmitters which transmit a carrier as a response message to said query message, only when said data could not be received normally, provided in said plural substations respectively;
wherein, whenever said main station receives a certain signal wave after transmitting said query message, said main station judges the signal wave said carrier transmitted from one or more of said plural substations and retransmits said data addressed to all of said plural substations and wherein when said main station detects no signal during a certain time period, the main station transmits the next transmission data.

2. The data communication system, according to claim 1, wherein said main station receives said carrier within a prescribed period of time after the transmission of said query message.

3. The data communication system, according to claim 2, wherein said prescribed period of time is the period until the time to start the next transmission of said data.

4. The data communication system, according to claim 2, wherein said main station determines that all of said plural substations were able to receive said data normally, when said main station does not receive said carrier within said prescribed period of time.

5. The data communication system, according to claim 4, wherein said main station effects the next data transmission when said carrier is not received within said prescribed period of time.

6. The data communication system, according to claim 2, wherein said main station determines that any of said plural substations was unable to receive said data normally, when said main station receives said carrier within said prescribed of time.

7. The data communication system, according to claim 6, wherein said main station re-transmits said data when said carrier is received within said prescribed period of time.

8. The data communication system, according to claim 7, wherein said main station terminates the transmission of said data and effects the transmission of next data when said carrier is received after the same data have been transmitted a prescribed number of times.

9. The date communication system, according to claim 8, wherein said main station changes said prescribed number of times.

10. The data communication system, according to claim 1, wherein said plural substations, when said normally received data are received once more, delete said data.

11. The data communication system, according to claim 1, wherein said plural substations, when said data that could not be normally received are received once more, store said data.

* * * * *